(12) United States Patent
Larson

(10) Patent No.: US 6,370,593 B1
(45) Date of Patent: Apr. 9, 2002

(54) APPARATUS FOR MULTIPLEXING BUS INTERFACES ON A COMPUTER EXPANSION

(75) Inventor: Douglas A. Larson, Lakeville, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/244,598

(22) Filed: Feb. 4, 1999

(51) Int. Cl.[7] .............................................. G06F 13/00
(52) U.S. Cl. .............................. 710/1; 710/2; 710/100
(58) Field of Search .......................... 710/1, 7, 15, 20, 710/21, 36, 82, 100–101, 126, 128, 131, 2

(56) References Cited

U.S. PATENT DOCUMENTS

| | | | |
|---|---|---|---|
| 5,136,394 A | | 8/1992 | Haikawa et al. ............ 355/335 |
| 5,189,610 A | | 2/1993 | Kaplan et al. ............... 364/419 |
| 5,533,204 A | * | 7/1996 | Tipley ......................... 710/108 |
| 5,793,996 A | * | 8/1998 | Childers et al. ............. 710/129 |
| 5,898,886 A | * | 4/1999 | Hewitt ......................... 710/70 |
| 5,905,879 A | | 5/1999 | Lambrecht .................. 395/297 |
| 5,951,664 A | | 9/1999 | Lambrecht et al. .......... 710/124 |
| 6,061,756 A | * | 5/2000 | Dutton et al. ................ 710/129 |
| 6,085,277 A | * | 7/2000 | Nordstprm et al. .......... 710/263 |
| 6,108,729 A | * | 8/2000 | Maguire et al. ............. 710/101 |
| 6,115,767 A | * | 9/2000 | Hashimoto et al. .......... 710/107 |
| 6,205,208 B1 | | 3/2001 | Detlefsen et al. ........ 379/93.05 |

* cited by examiner

Primary Examiner—Thomas Lee
Assistant Examiner—Rijue Mai
(74) Attorney, Agent, or Firm—Dorsey & Whitney LLP

(57) ABSTRACT

A computer system includes a processor/PCI bus bridge that couples a processor bus to a relatively high-speed expansion bus, such as a PCI bus and a PCI extension bus. The PCI extension bus is coupled to a 32-bit PCI device, a 64-bit PCI device, and a non-PCI device, such as a device normally connected to a relatively low speed bus. In operation, an arbiter in the bus bridge selectively grants either the 64-bit PCI device or the non-PCI device access to the PCI extension bus. Data transfers between the processor bus and the non-PCI device can occur simultaneously with data transfers between the processor bus and the 32-bit PCI device. Several non-PCI devices may be coupled to the PCI extension bus. Data transfer between the processor bus and the non-PCI devices may be accomplished alternately if the non-PCI devices share the same lines of the PCI extension bus or simultaneously in the non-PCI devices use different lines of the PCI extension bus.

57 Claims, 7 Drawing Sheets

APPARATUS FOR MULTIPLEXING BUS INTERFACES ON A COMPUTER EXPANSION

TECHNICAL FIELD

This invention relates to computer system architecture, and, more particularly, to an apparatus for coupling signals between a processor bus and peripheral devices that do not use the same data transfer protocol.

BACKGROUND OF THE INVENTION

Continual advances are being made in a microprocessor technology to push the performance of personal computers to increasingly higher levels. These advances have resulted in an increased amount of data being transferred between the computer's central processor and a wide variety of peripheral devices. With this increased volume of data transfer has come the need for faster transfers of data between the processor and peripheral devices. Faster data transfer rates have resulted from continuous improvements in the manner in which data are transferred between the processor and the peripheral devices.

Devices normally communicate with the processor through an input/output "IO" bus. An early expansion bus, known as an Industry Standard Architecture ("ISA") bus, satisfied the need for high-speed data transfer for many years. An extension to the ISA bus, known as an "EISA" bus was subsequently developed. Another bus architecture, known as Micro-Channel bus architecture, was also developed to provide high speed data transfer. Eventually, the IO demands of new computer systems exceeded the IO bandwidth limits of these bus architectures, making the IO bus a system throughput bottleneck. To resolve this bottleneck, a higher speed IO buses was developed, most recently the Peripheral Component Interconnect ("PCI") bus architecture. However, PCI bus architecture has not yet completely replaced these earlier bus architectures because many presently available peripheral devices are unable to interface with a PCI bus. This is particularly true for relatively low speed peripheral devices, such as keyboards. As a result, state of the art computer systems continue to include these early bus designs, which are known as "legacy" buses. The continued use of legacy buses also results from the requirement that computer systems be "backward compatible" so that they can interface with peripheral devices, known as "legacy" devices, designed for older computer architectures as well as peripheral devices designed for state-of-the-art computer architectures. The same factors that dictate the continued use of these earlier bus designs also dictate the continued use of other legacy bus formats, interfaces, and devices, such as Integrated Device Electronics ("IDE") buses and interfaces that are commonly used to interface processors to IDE disk drives. The term "legacy bus" is intended to encompass all of these ISA buses, EISA buses, Micro-Channel buses, IDE buses, and other pre-PCI buses.

As a result of the continuing need to interface with legacy devices, currently available computer systems generally include a PCI bus to provide high data transfer rates between the processor and peripheral devices, and a legacy bus, such as an ISA bus, to allow the processor to interface with relatively low speed peripheral devices and peripheral devices that are not yet capable of coupling to the PCI bus. A computer system 10 using conventional personal computer architecture is illustrated in FIG. 1. The computer system 10 includes one or more central processors 12a,b, which may be microprocessors such as Pentium II® microprocessors sold by Intel Corporation. The processors 12 are each coupled to a processor bus 14, which, as it well-known in the art, includes an address bus, a data bus, and a control/status bus. The processor bus 14 is coupled to a Processor/PCI bus bridge 16, which is also sometimes known as a "North Bridge." The bus bridge 16 couples the processor bus 14 to an IO bus, such as a PCI bus 18. The bus bridge 16 also couples the processor 12 to a system memory device 20 through a memory bus 22. The memory device 20 may be, for example, a dynamic random access memory ("DRAM"). Finally, the bus bridge 16 couples the processor 12 to various other devices (not shown), such as a graphics accelerators, a USB, or a network interface.

The PCI bus 18 is coupled to various internal PCI devices 26 and to internal PCI connectors 28 that may be coupled to various external PCI devices (not shown). The PCI bus 18, which is a relatively high-speed bus, is also coupled to a relatively low speed legacy bus 24 through a PCI/Legacy bus bridge 30, which is also sometimes known as a "South Bridge." The bus bridge 30 also couples the PCI bus 18 to a mass storage device, such as a disk drive 32, through an IDE bus 34. For this purpose, the bus bridge 30 includes an IDE disk controller (not shown). Various relatively slow speed peripheral devices are coupled to the legacy bus 24. Internal legacy devices 40 are coupled directly to the legacy bus 24 while external legacy devices (not shown) are coupled through legacy connectors 42. The ISA bus 24 may also be coupled to various user interface devices (not shown), such as a floppy disk drive, a serial port, a parallel port, a mouse, and a keyboard, through a conventional input/output ("IO") integrated circuit 46.

The Processor/PCI bus bridge 16 is shown in greater detail in FIG. 2. The bridge 16 includes a processor interface 50 that is coupled to the processor bus 14, a memory interface 52 that is coupled to the memory bus 22, a PCI interface 54 that is coupled to the PCI bus 18, and non-PCI interfaces 56 that are coupled to other peripheral devices, as explained above with reference to FIG. 1. The bus bridge 16 also includes a configuration register 58 that is programmed during initialization with various parameters to control the operation of the bus bridge 16. The structure and operation of the interfaces 50–56, as well as the manner in which they interact with each other, are well-known to one skilled in the art. Therefore, further description of these conventional aspects of the bus bridge 16 will be omitted in the interest of brevity.

The computer system 10 shown in FIG. 1, in the past, achieved satisfactory performance. However, with the increasing need for ever faster computer systems, the relatively low speed of the legacy bus 24 has slowed the data transfer rates to and from peripheral devices coupled to the legacy bus 24 to unacceptably slow levels. As a result, peripheral devices formerly coupled to the legacy bus 24 are increasingly being coupled to the PCI bus 18. It would also be desirable to couple devices that are now coupled to the PCI/Legacy bus bridge 30, such as the IDE bus 34 and the disk drive 32, to the Processor/PCI bus bridge 16, thereby saving the time needed to couple signals through the PCI bus 18 and PCI/Legacy bus bridge 30. Coupling these devices to the PCI bus 18 rather than the legacy bus 24 would also allow elimination of the legacy bus 24 and associated circuitry thereby reducing the cost of computer systems. However, coupling peripheral device that are not designed to interface with a PCI bus (referred to as "non-PCI devices) presents a number of problems that would appear to be difficult to overcome. For example, moving the IDE disk controller for the disk drive 32 from the PCI/Legacy bus bridge 30 to the Processor/PCI bus bridge 16 would necessitate adding a large number of connector terminals or "pins" to the bus bridge 16. However, the number and density of connector pins in the PCI bus bridge 16 is, many cases, already approaching the maximum limits of what is possible with conventional technology. As a result, it has become increasingly difficult to relocate peripheral devices from slower speed buses to higher speed buses or higher speed bus bridges.

SUMMARY OF THE INVENTION

In accordance with the present invention, a relatively high-speed bus, such as a PCI bus, is used to interface a processor to peripheral devices specifically adapted to the high-speed bus. A subset of signal lines of the high-speed bus is also used to interface the processor to peripheral devices specifically adapted to lower speed buses, such as an IDE disk drive and legacy peripheral devices. In the case of a PCI bus having a PCI extension bus, the PCI extension bus may be coupled to a lower speed peripheral device at the same time as a PCI peripheral device is coupled to the remainder of the PCI bus. One or more low speed peripheral devices may be coupled to the PCI extension bus. If two or more low speed peripheral devices are coupled to the PCI extension bus, the are either simultaneously coupled to different lines of the PCI extension bus or alternately coupled to the same lines of the PCI extension bus.

DETAILED DESCRIPTION OF THE INVENTION

In the following, a novel computer system and method is described with certain specific details set forth in order to provide a sufficient understanding of various embodiments of the present invention. However, one skilled in the art will understand that the present invention may be practiced without these details. In other instances, well-known circuits, control signals, timing protocols, and software operations are not described in detail in order not to unnecessarily obscure the description of the embodiments of the invention.

Figure 3:
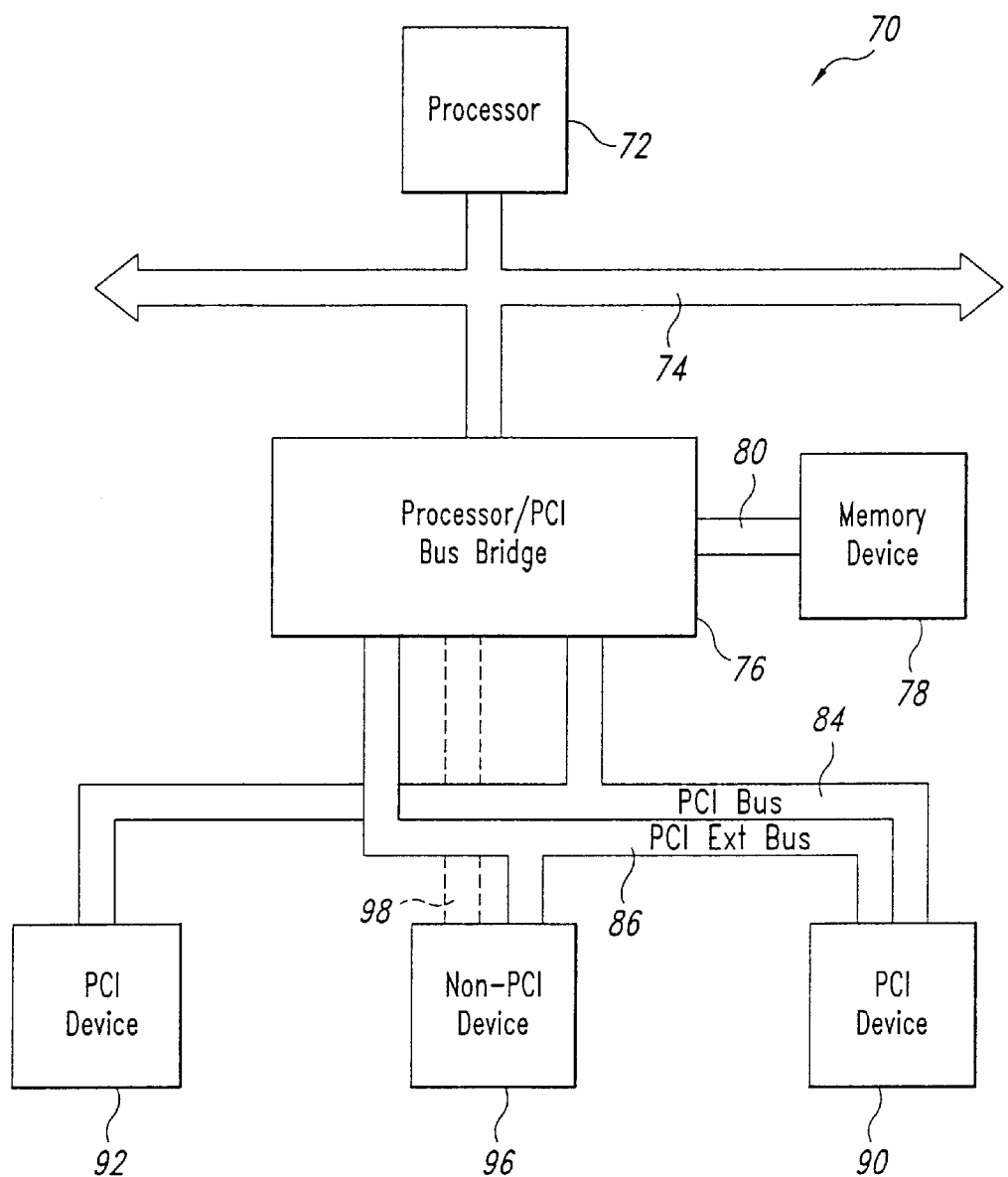
FIG. 3 is a block diagram of an embodiment of a computer system in accordance with the invention.

One embodiment of a computer system 70 in accordance with the invention is illustrated in FIG. 3. The computer system 70 includes a processor 72 coupled to a processor bus 74, as explained above. Also coupled to the processor bus 74 is a Processor/PCI bus bridge 76. The bus bridge 76 is coupled to a memory device 78 through a memory bus 80, as also explained above. The memory device 78 may be a DRAM, such as a Synchronous DRAM ("SDRAM") or a packetized Synchronous Link DRAM ("SLDRAM"), a Static Random Access Memory ("SRAM"), or any other type of conventional or hereinafter developed data storage device. The bus bridge 76 is also coupled to a PCI bus 84 and to a PCI extension bus 86. As is well-known in the art, the PCI bus 84 includes 32 time-multiplexed address/data lines, 4 command/bit-enable lines, and a number of other command and status lines. To increase the data and addressing capacity of the PCI bus 84, the PCI extension bus 86 has been added in more recent implementations. The PCI extension bus 86 includes 32 additional time-multiplexed address/data lines, 4 additional command/bit-enable lines, a parity line PAR64, an active low request line REQ64#, and an active low acknowledge line ACK64#.

In operation, a device initiating a PCI bus transfer, known as a "PCI Master", generates various control signals that are received by another PCI device, known as a "target device." A PCI bus arbiter (not shown) is used to control PCI Master's access to the PCI bus 84. At any instant in time, only one PCI Master has access to the PCI bus 84. The PCI arbiter uses an implementation specific algorithum for determining which PCI Master gets access to the PCI bus 84. The PCI master device asserts a REQ# output to the arbiter to request access to the PCI bus 84 and the PCI extension bus 86. The arbiter uses an arbitration procedure or algorithm to grant the requesting PCI master device access to the bus at the proper time by asserting a GNT# output to the requesting PCI master. The PCI master then has access to the buses 84, 86. If the PCI master device is also capable of a 64-bit data transfer, it may also assert its REQ64# output to the PCI target device to request a 64-bit data transfer to or from the PCI target device using the PCI bus 84 and the PCI extension bus 86. If the PCI Master device is not capable of a 64-bit data transfer, it will not assert a REQ64# output. If the target device is capable of a 64-bit data transfer, the target device may assert its ACK64# output, which is coupled to the PCI master device to inform the master device that a 64-bit data transfer can occur on the PCI bus 84 and the PCI extension bus 86. If the PCI target device does not assert its ACK64# output within a pre-determined time, data are transferred using only the PCI bus 84. Even if the PCI target device is capable of a 64-bit data transfer, it may decline to assert its ACK64# output, thereby limiting a data transfer to 32 bits coupled through the PCI bus 84. Similarly, even if the PCI Master is capable of a 64-bit data transfer, it may decline to assert its REQ64# output, thereby also limiting data transfer to 32 bits coupled through the PCI bus 84.

Figure 1:
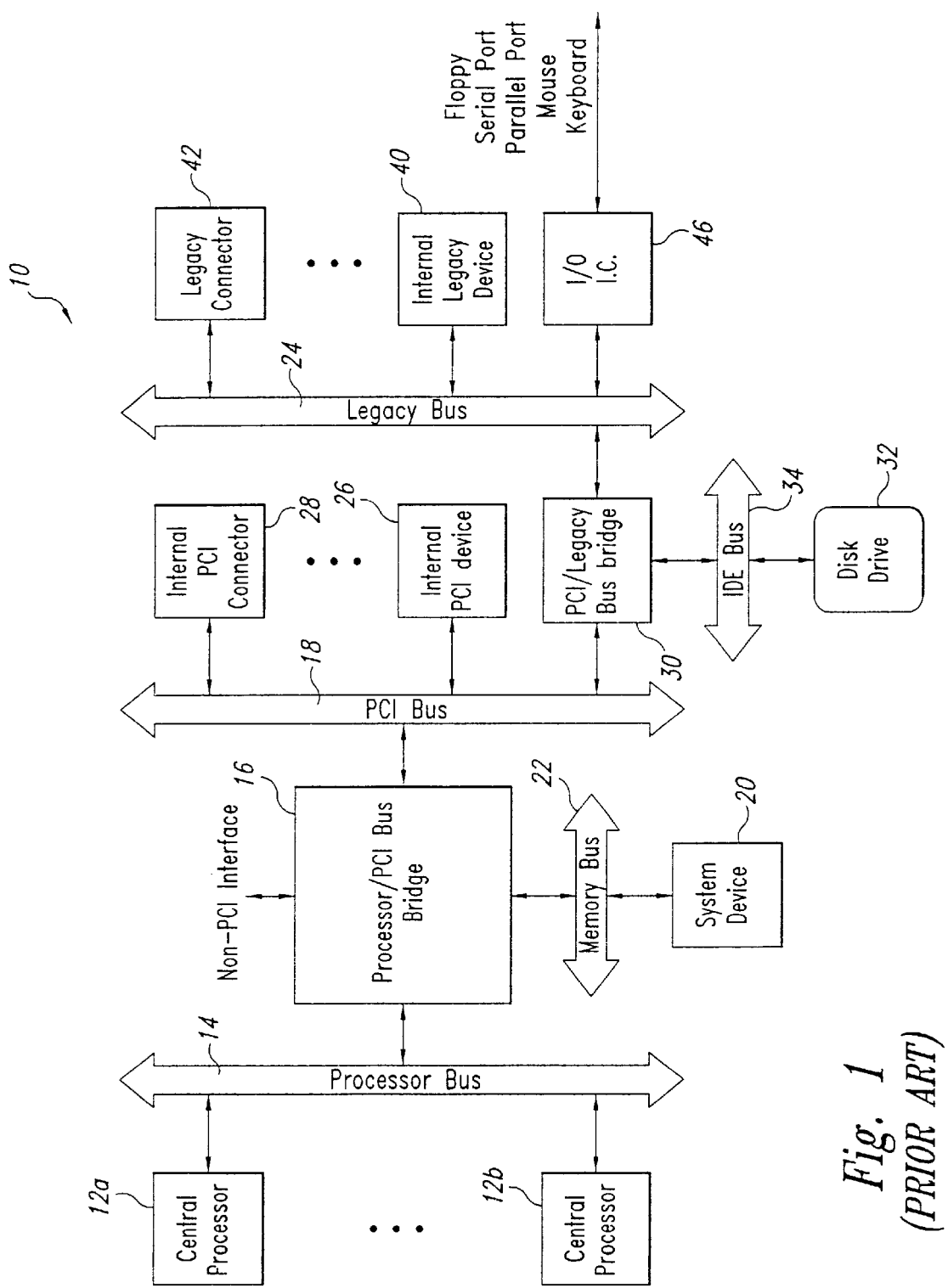
FIG. 1 is a block diagram of a conventional computer system of the type in which an embodiment of the invention may be incorporated.

A conventional PCI device 90 capable of a 64 bit data transfer is coupled to the PCI bus 84 and the PCI extension bus 86. A conventional PCI device 92 capable of only a 32-bit data transfer is coupled to only the PCI bus 84. The coupling of the PCI devices 90, 92 to the bus bridge 76 is conventional. However, what is not conventional is the coupling of a non-PCI device 96 to the PCI extension bus 86. The non-PCI device 96 may be, for example, an IDE disk drive 32 (FIG. 1) in which case the bus bridge 76 will incorporate a IDE disk controller (not shown) coupled to the PCI extension bus 86. The non-PCI device 96 may also be an ISA device, which would allow the ISA bus 24 (FIG. 1) to be omitted from the computer systems 70 and still allow relatively slow speed ISA devices to be coupled to the processor 72. The non-PCI device 96 may also be any other device that is not specifically adapted to be interfaced to a PCI bus, and it will generally use a different data transfer protocol and have a different signal configuration than a PCI device. The PCI extension bus 86 contains 64 signal lines, which is a sufficient number to interface with a legacy devices such as an 8 bit ISA device. However, a 16 bit ISA device requires an additional 32 signal paths. In the event the non-PCI device 96 requires more than 64 signal paths, such as a 16-bit ISA device, the additional signal paths can be provided by a separate bus 98 extending from the bus bridge 76 to the non-PCI device 96.

The embodiment of the invention illustrated in FIG. 3 provides one or more advantages compared to prior art computer architectures. First, by allowing the PCI extension bus 86 to be used for interfacing with a non-PCI device 96, the bus bridge 76 may omit a large number of IO terminals that would otherwise been required to interface the bus bridge 76 with the non-PCI device 96. The omission of these large number of IO terminals may make it practical to move functions formerly accomplished by a relatively slow speed bus device to the PCI bus bridge 76, since it might otherwise be impractical to include these additional IO terminals in a single integrated circuit package.

Second, the embodiment of FIG. 3 allows PCI data transfers and non-PCI data transfers to occur at the same time. For example, when data are being transferred between the bus bridge 76 and the PCI device 92 using the PCI bus 84, data may be transferred between the bus bridge 76 and the non-PCI device 96 using the PCI extension bus 86. Yet the PCI extension bus 86 remains available to couple data between the bus bridge 76 and the PCI device 90 in the event of a 64-bit PCI data transfer.

Third, the embodiment of FIG. 3 provides a great deal of flexibility in the manner which data can be transferred between the bus bridge 76 and the peripheral devices 90–96. For example, additional non-PCI devices 96 may be coupled to the PCI extension bus 86, and data transfer with the multiple non-PCI devices may occur in a time multiplexed manner. Alternatively, different signal lines in the PCI extension bus 86 may be coupled to different non-PCI devices 96, although some of the same signal lines in the PCI extension bus 86 may be coupled to multiple non-PCI devices 96.

Finally, the embodiment of FIG. 3 is inherently compliant with virtually all PCI computer architectures since, when performing PCI data transfers, the PCI bus bridge 76 and the PCI devices 90, 92 operate in a conventional manner. Thus, 64 bit PCI devices 90 will continue to operate using the PCI bus 84 and the PCI extension bus 86, and PCI devices 92 capable of only a 32-bit data transfer will continue to operate using only the PCI bus 84.

Figure 2:
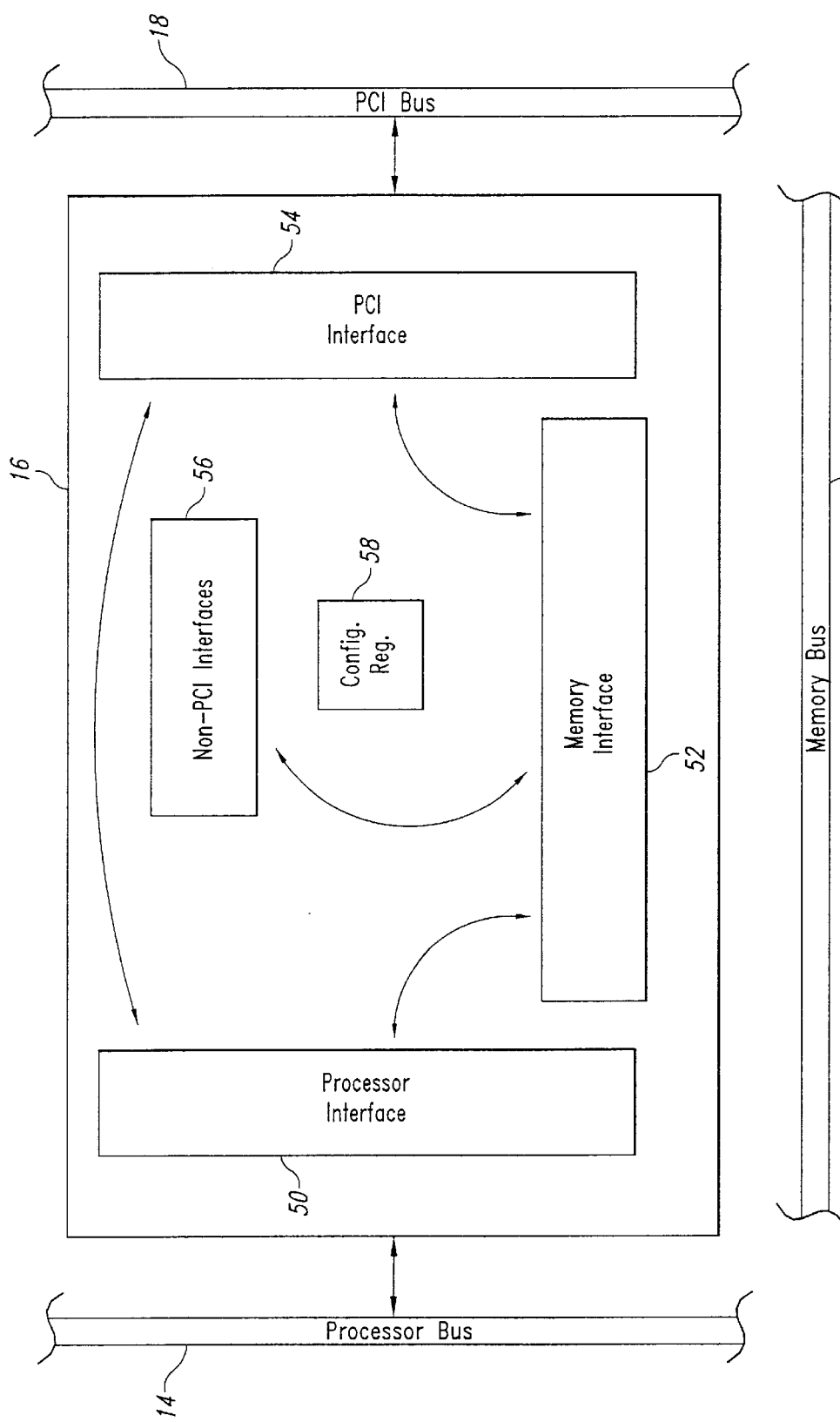
FIG. 2 it is a block diagram of a conventional processor/PCI bus bridge used in the computer system of FIG. 1.
Figure 4:
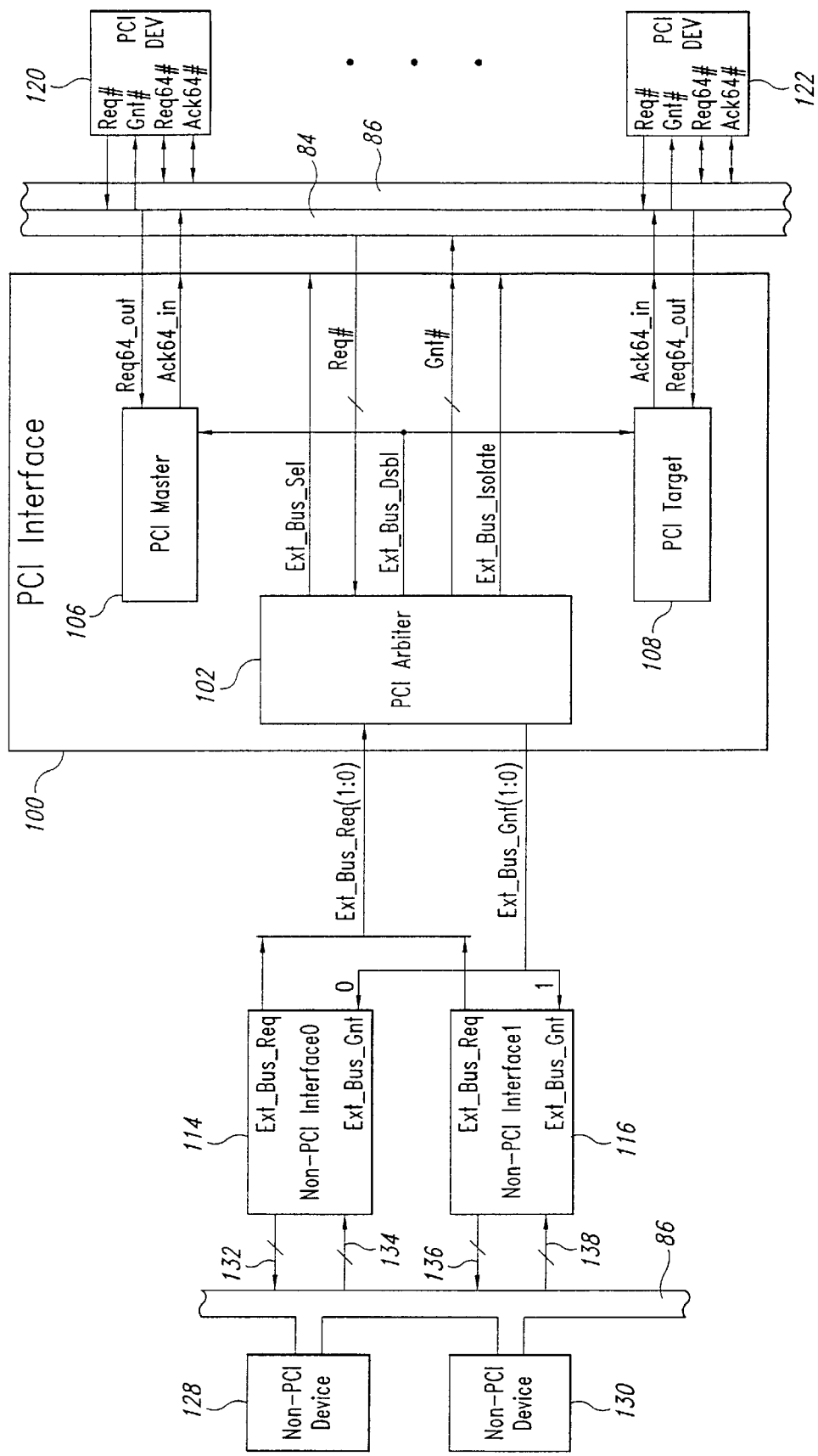
FIG. 4 is a block diagram of portions of a processor/PCI bus bridge used in the computer system of FIG. 3.

As mentioned above, the conventional Processor/PCI bus bridge 16 (FIG. 1) includes a PCI interface 54 (FIG. 2). Similarly, the Processor/PCI bus bridge 76 used in the embodiment of FIG. 3 also includes a PCI interface 100, which is illustrated in FIG. 4. The PCI interface 100 includes a PCI arbiter 102 that is coupled to a PCI master 106, a PCI target 108, and a pair of non-PCI interfaces 114, 116. The PCI master 106 and the PCI target 108 are coupled through the PCI bus 84 and the PCI extension bus 86 to a pair of 64 bit PCI devices 120,122. The non-PCI interfaces 114, 116 are coupled to respective non-PCI devices 128, 130 through buses 132, 134 and 136, 138, respectively, and the PCI bus 86. As mentioned above, the PCI arbiter 102 determines and controls the order of data transfer between the peripheral devices 90–96 and the bus bridge 76. As also mentioned above, a PCI master device attempting to initiate a data transfer through the PCI bus applies an active low REQ# output to a bus arbiter. The bus arbiter determines when the PCI bus is free to be accessed by the PCI master, and then grants the PCI master access to the bus by applying an active low GNT# signal to the PCI master. The PCI master then initiates data transfer with a PCI target using the PCI bus 84 and, in the event of a 64-bit data transfer, also using the PCI extension bus 86. In the embodiment of FIG. 4, each PCI device 120, 122 can be a PCI master device (by initiating a data transfer) as well as a PCI target device (by having a data transfer directed at it). All of these data transfers between a PCI Master device and a PCI target device are known as PCI transactions. Thus, each PCI device 120, 122 is connected to the arbiter 102 through a respective pair of REQ# and GNT# signal lines. Since the REQ# and GNT# signals are used with all PCI data transfers, they are coupled through the PCI bus 84 rather than through the PCI extension bus 86.

In a similar manner, the non-PCI interfaces 114, 116 assert respective Ext_Bus_Req signals when the non-PCI devices 128, 130, respectively, are attempting to initiate a data transfer. When the PCI extension bus 86 is not being used by one of the PCI devices 120, 122, the PCI arbiter 102 may assert an Ext_Bus_Gnt signal to the requesting interface 114, 116 to allow data transfer between the non-PCI device 128 and the PCI extension bus 86.

As also explained above, some PCI devices, for example the PCI device 90 (FIG. 3), are capable of the 64-bit data transfer while other PCI devices, such as the PCI device 92, are capable of only a 32-bit data transfer. PCI devices that are only 32-bit capable are connected only to the PCI bus 84 and not the PCI extension bus 86, while 64-bit capable PCI devices are connected to both the PCI bus 84 and the PCI extension bus 86. If the bus master 106 is capable of a 64-bit data transfer and it elects to perform a 64-bit data transfer, it asserts an active low REQ64# output, which is coupled to all of the 64 bit PCI targets in the computer system. If the PCI target to which the data transfer is directed is capable of a 64-bit data transfer and likewise elects to perform a 64-bit data transfer, it asserts an active low ACK64# output, which is coupled to all of the 64 bit PCI masters in the computer system. If either the PCI Master does not assert its REQ64# output or the PCI target does not respond by asserting its ACK64# output, the PCI transaction proceeds as a 32-bit transaction. If the PCI Master is capable of only a 32-bit transaction, it does not have a REQ64# output. Therefore, it cannot assert a REQ64# signal to request a 64-bit transaction. As a result, a 64-bit PCI target will not respond by asserting its ACK64# output to allow a 64-bit PCI transaction. Similarly, if the PCI target is only capable of a 32-bit transaction it does not have a ACK64# output. Therefore, it cannot assert an ACK64# signal to allow a 64-bit PCI transaction.

Many PCI peripheral devices, including the PCI devices 120, 122 shown in FIG. 4, can both receive data and send data, and are thus alternatively a PCI master and a PCI target. Thus, since these PCI devices 120, 122 as well as the PCI Master 106 and PCI target 108 are 64-bit capable, the PCI devices 120, 122 include both REQ64# inputs and outputs as well as ACK64# inputs and outputs.

The REQ64# signal applied to the PCI device 120 is generated by the PCI master 106, and the resulting ACK64# signal generated by the PCI device 120 is received by the PCI master 106. Since the PCI device 120 may act as a bus master by initiating a data transfer, the PCI device 120 may assert the REQ64# signal to the PCI target 108 to request a 64-bit data transfer. The PCI target 108 is capable of a 64-bit data transfer, and it therefore asserts its ACK64# output, which is received by the PCI device 120. Since the REQ64# and ACK64# signals are used only with 64-bit PCI data transfers, and they are therefore coupled through the PCI extension bus 86 rather than through the PCI bus 84. Data transfers between the PCI device 122 and the PCI Master 106 and between the PCI device 122 and the PCI target is the same as explained above with respect to the PCI device 120.

The signals coupled through the PCI extension bus 86 between the non-PCI interfaces 114, 116 and the non-PCI device 128 will depend upon the nature of the non-PCI device 128. For sample, if the non-PCI device 128 is adapted to interface with a legacy bus, the non-PCI interfaces 114, 116 will output and receive conventional legacy bus signals. If the non-PCI device 128 is an IDE disk drive, the non-PCI interfaces 114, 116 will output and receive conventional IDE signals.

The PCI arbiter 102 also selectively outputs a Ext_Bus_Dsb1 signal to the PCI master 106 and the PCI target 108. The PCI arbiter 102 asserts the Ext_Bus_Dsb1 signal when the non-PCI device when 28 is accessing the PCI extension bus 86 to inform the PCI master 106 and the PCI target 108 that the bus 86 is not available for transactions with one of the PCI devices 120, 122. When the Ext_Bus_Dsb1 signal is asserted, the PCI master 106 will not assert its REQ64# output to request a 64-bit data transfer, nor will the PCI target 108 asserts its ACK64# output to permit a 64 bit data transfer requested by one of the PCI devices 120, 122.

The PCI arbiter 102 also selectively generates an Ext_Bus_Sel signal and an Ext_Bus_Isolate signal. The Ext_Bus_Sel signal is used to multiplex the appropriate data onto the PCI extension bus 86 where bus lines are shared by multiple devices 120, 122, 128, 130, as explained in greater detail below. As also explained in greater detail below, the Ext_Bus_Isolate signal is preferably used to selectively isolate the PCI devices 120, 122 from the PCI extension bus 68. Isolation of the PCI devices 120, 122 is currently desirable at times because the current PCI protocol permits 64-bit PCI devices to drive data onto the PCI extension bus 86 even when they are restricted to a 32bit data transfer. As a result, were it not for this isolation, bus contention on the PCI extension bus 86 could occur when a non-PCI device 128, 130 was applying data to the PCI extension bus 86. The PCI arbiter 102 thus asserts the Ext_Bus_Isolate signal when one or both of the non-PCI devices 128, 130 is accessing the PCI extension bus 86. It will be understood, however, that isolation of the PCI devices 120, 122 may not be required if the PCI protocol is updated or revised to prevent 64-bit PCI devices from driving data onto the PCI extension bus 86 when they are restricted to a 32-bit transaction.

The operation of the PCI interface 100 will now be explained. In the event one of the non-PCI devices 128, 130 is not attempting to access the PCI extension bus 86, the PCI interface 100 operates in a normal manner. Since the non-PCI devices 128, 130 will not be accessing the bus 86, the non-PCI interfaces 114, 116 deassert their respective Ext_Bus_Req signals. As a result, the PCI arbiter 102 does not assert either of the Ext_Bus_Gnt signals. The PCI arbiter 102 also deasserts an Ext_Bus_Dsb1 signal so that the PCI devices 120, 122 may access the PCI extension bus 86. The PCI master 106 may therefore assert its REQ64# output to request a 64-bit data transfer, and the PCI target 108 may assert its ACK64# output to permit a 64 bit data transfer requested by one of the PCI peripheral devices 120, 122. Finally, the Ext_Bus_Isolate signal is deasserted to allow either of the PCI devices 120,122 to couple data to the PCI extension bus 86. As result, the PCI master 106 and the PCI target 108 can perform either 32 or 64-bit PCI data transfers without restrictions. In fact, under these circumstances, the computer system 70 (FIG. 3) operates as if the embodiments of the invention was not present in the system. The presence of an embodiment of the invention is therefore unlikely to adversely affect the operation of existing computer systems in which it is implemented.

In the event one of the non-PCI devices 128, 130 requires access to the PCI extension bus 86, the devices 128, 130 apply respective signals to the non-PCI interfaces 114, 116. The non-PCI interface, e.g., interface 114, then asserts its Ext_Bus_Req output. In response, the PCI arbiter 102 asserts its Ext_Bus_Dsb1 output to prevent the PCI master 106 from initiating any 64-bit data transfer and to prevent the PCI target 108 from acknowledging any requests for a 64-bit data transfer. As a result, neither of the PCI devices 120, 122 can access the PCI extension bus 86, thereby leaving the bus 86 available for access by the non-PCI device 128. The PCI arbiter 102 subsequently determines when the data transfer with the non-PCI device 128 should occur. It then asserts its Ext_Bus_Gnt output to inform the non-PCI interface 114 that the bus 86 is available, and the asserts its Ext_Bus_Isolate output to isolate the PCI devices 120, 122 from the PCI extension bus 86. The non-PCI device 128 then transfers data through the bus 86 for as long as the non-PCI interface 114 continues to assert its Ext_Bus_Req output. Significantly, during the time the non-PCI device 128 is transferring data through the bus 86, the PCI devices 120, 122 may also be transferring data through the PCI bus 84. However, since the PCI extension bus 86 is being accessed by the non-PCI device 128, the PCI device may not perform any 64-bit data transfers. When the non-PCI device 128 has completed its data transfer, it causes the interface 114 to deassert its Ext_Bus_Req output. In response, the PCI arbiter 102 deasserts its Ext_Bus_Gnt output so that the interface 114 can no longer grant the non-PCI device 128 access to the bus 86. The PCI arbiter 102 also asserts its Ext_Bus_Dsb1 output to allow the PCI master 106 and PCI target 108 to grant and acknowledge 64-bit data transfers, and deasserts its Ext_Bus_Isolate output to once again couple the PCI devices 120, 122 to the PCI extension bus 86.

Although only two non-PCI devices 128, 130 are shown in FIG. 4, it will be understood that additional non-PCI devices may be included in the computer system. Furthermore, multiple non-PCI devices may access the PCI extension bus 86 at the same time as long as they are coupled to different lines of the bus 86. In such cases, and assuming each non-PCI interface 114, 116 performs transactions with at least one respective non-PCI device, each interface 114, 116 will assert its respective Ext_Bus_Req output. The PCI arbiter 102 then responds to the asserted Ext_Bus_Req signals in the same manner as it responded to a single asserted Ext_Bus_Req signal, as explained above, except that it will assert both of its Ext_Bus_Gnt outputs. One of the non-PCI devices 128, 130 can then transfer data through the PCI extension bus 86 in the same manner as explained above. Again, the PCI devices 120, 122 may be simultaneously coupling data through the PCI bus 84, although no 64-bit data transfers may occur since the PCI extension bus 86 is being accessed by one of the non-PCI devices 128, 130.

Two or more non-PCI devices 128, 130 may also access the PCI extension bus 86 even if they share the same PCI extension bus lines, as long as they do not access those lines at the same time. Specifically, the non-PCI interfaces 114, 116 assert their respective Ext_Bus_Req outputs since the respective non-PCI devices 128, 130 to which they are coupled are both attempting to access the bus 86. The PCI arbiter 102 then asserts its Ext_Bus_Dsb1 and Ext_Bus_Isolate outputs, as explained above. However, rather than granting both non-PCI interfaces 114, 116 access to the PCI extension bus 86, the PCI arbiter 102 grants only one non-PCI interface, e.g., interface 114, access by asserting its Ext_Bus_Gnt(0) output. The PCI arbiter 102 determines which interface 114, 116 should first access the bus 86 using conventional bus arbitration principles an algorithms. The non-PCI device 128 then transfers data through the PCI extension bus 86. When data transfer is complete, the non-PCI interface 114 deasserts its Ext_Bus_Req output. In response, the bus arbiter 102 deasserts its Ext_Bus_Gnt (0) output and asserts its Ext_Bus_Gnt(1) output to allow the non-PCI interface 116 access to the bus 86. When the non-PCI device 130 coupled to the interface 116 has completed its data transfer, the interface 116 deasserts its Ext_Bus_Req output. The PCI arbiter 102 then responds as explained above.

Figure 5:
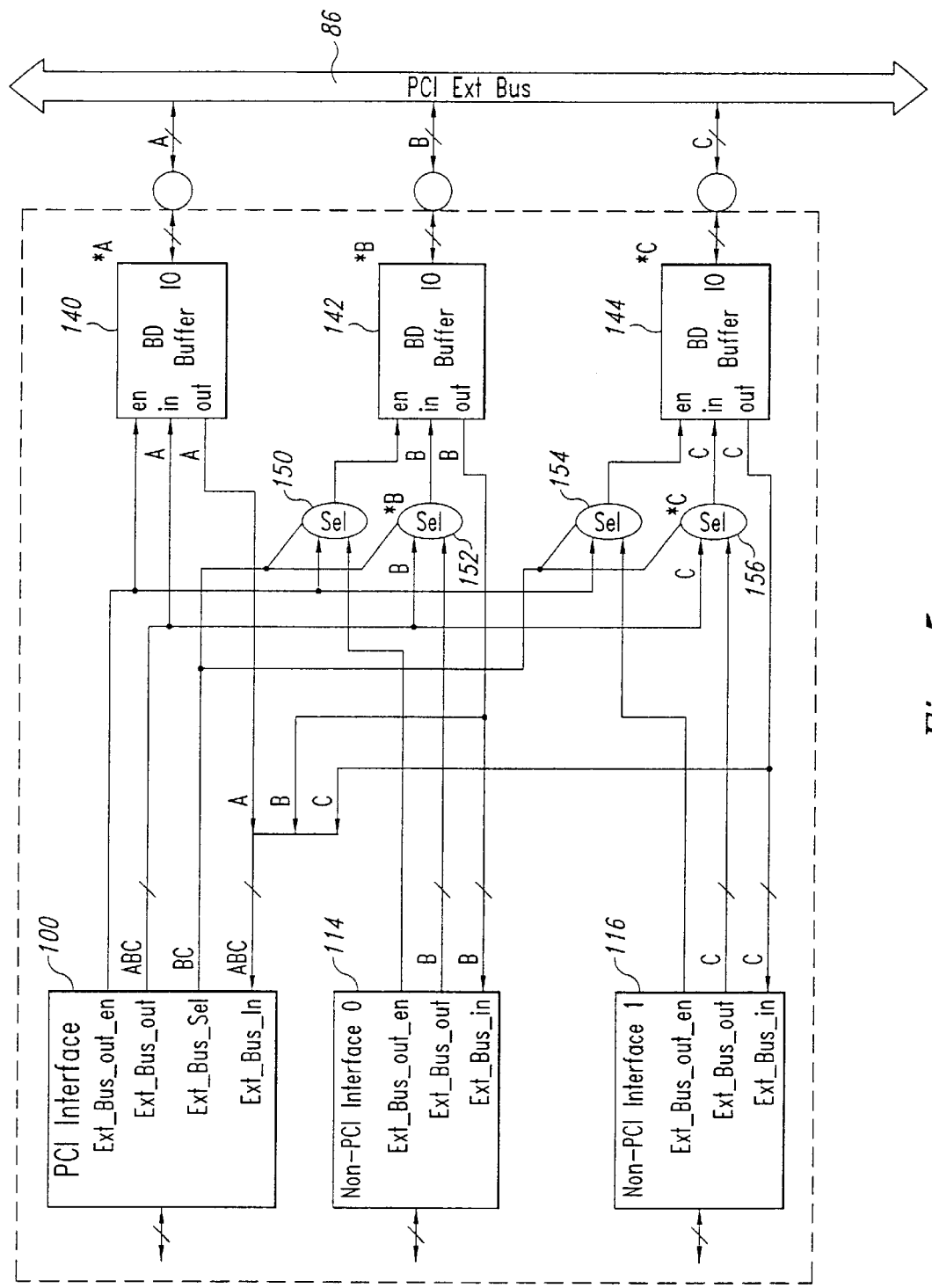
FIG. 5 is a block diagram of one embodiment of other portions of the processor/PCI bus bridge used in the computer system of FIG. 3.
Figure 6:
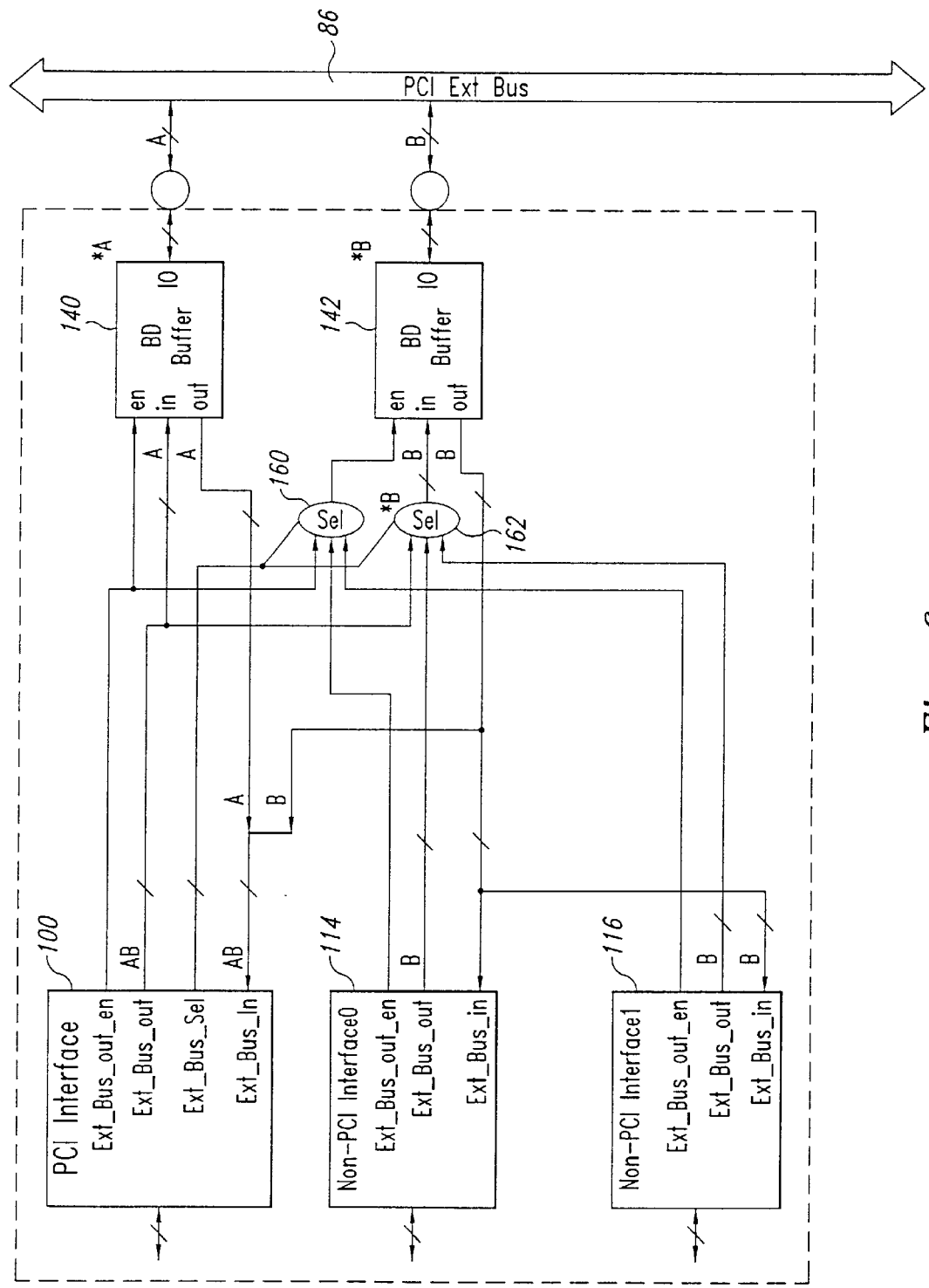
FIG. 6 is a block diagram of another embodiment of other portions of the processor/PCI bus bridge used in the computer system of FIG. 3.

FIG. 4 shows portions of the PCI interface 100 relating to arbitration. The remaining portions of various embodiments of the PCI interface 100 are shown in FIGS. 5 and 6. With reference to FIG. 5, the PCI interface 100 and the non-PCI interfaces 114, 116 are coupled to the PCI extension bus 86 through three bidirectional buffers 140, 142, 144 and four multiplexers 150, 152, 154, 156. Each of the buffers 140, 142, 144 has a bidirectional IO terminal coupled to the PCI extension bus 86, an OUT terminal coupling data from the bus 86 when an enable EN is high, and an IN terminal coupling data to the bus 86.

The signal lines shown in FIG. 5 are labeled with one or more letters "A", "B", and/or "C". The "A" designates signal lines that are not coupled to either of the non-PCI interfaces 114, 116 but are instead coupled only to the PCI interface 100. The "B" designates signal lines that are coupled to both the non-PCI interface 114 and the PCI interface 100. Finally, the "C" designates signal lines that are coupled to both the non-PCI interface 116 and the PCI interface 100. Each of the signal lines represent either a single signal line or a bus, as designated in FIG. 5, and the nature of the signal lines depends upon the characteristic of peripheral devices to which they are coupled. The signals coupled to the PCI interface 100 will, of course, be signals corresponding to the well-known PCI protocol. The signals coupled to the non-PCI interfaces 114, 116 may, for example, correspond to conventional ISA protocol. The bus lines designated by the letter "A" are coupled to the bidirectional buffer 140. The outputs from and inputs to the bidirectional buffer 140 are coupled as inputs and outputs, respectively, directly to the PCI interface 100 without the need to multiplex these lines since they are not coupled to any other interface 114, 116. The bidirectional buffer 140 is enabled to couple data output from the PCI interface 100 to the extension bus 86 by an Ext_Bus_Out_En output from the PCI interface 100.

The bidirectional buffer 142 is coupled to the lines of the bus 86 labeled "B". The outputs from the buffer 142 are coupled directly to the bus inputs of the PCI interface 100 and the non-PCI interface 114. Similarly, the outputs from the buffer 144 are coupled directly to the bus inputs of the PCI interface 100 and the non-PCI interface 116. Although signals on these bus lines are coupled to both interfaces 100, 114, only one interface is active at a time because of the arbitration occurring for the PCI extension bus 86, as explained above. However, as also explained above, the buffer 142 is enabled for inputs from the interfaces 100, 114 by an EN signal from the multiplexer 150 depending upon the logic level of the Ext_Bus_Sel output from the PCI interface 100. Similarly, the buffer 144 is enabled for inputs from the interfaces 100, 116 by an EN signal from the multiplexer 154 depending upon the logic level of the Ext_Bus_Sel output from the PCI interface 100.

As explained above with reference to FIG. 4, the Ext_Bus_Sel signal has a first state when one of the non-PCI interfaces 114, 116 accesses the bus 86, and a second state when the PCI interface 100 accesses the bus 86. Thus, the multiplexers 150, 154 and the multiplexers 152, 156 all operate in the same manner. As a result, both non-PCI interfaces 114, 116 are enabled at the same time so that the Ext_Bus_Dsb1 (FIG. 4) may be the same as the Ext_Bus_Sel signal.

If the Ext_Bus_Sel signal from the interface 100 has the first state, the multiplexer 150 couples the Ext_Bus_Out_En signal from the PCI interface 100 to the buffer 142, the multiplexer 152 couples signals from the Ext_Bus_Out terminals of the PCI interface 100 to the IN terminal of the buffer 142. The PCI interface 100 can then enable the buffer 142 to apply these signals to the PCI extension bus 86. At the same time, the multiplexer 154 couples the Ext_Bus_Out_En signal from the PCI interface 100 to the buffer 144, and the multiplexer 156 couples signals from the Ext_Bus_Out terminals of the PCI interface 100 to the IN terminal of the buffer 144.

If the Ext_Bus_Sel signal from the PCI interface 100 has the second state, the multiplexer 150 couples the Ext_Bus_Out_En signal from the non-PCI interface 114 to the buffer 142, and the multiplexer 152 couples signals from the Ext_Bus_Out terminals of the non-PCI interface 114 to the IN terminal of the buffer 142. The non-PCI interface 114 can then enable the buffer 142 to apply these signals to the PCI extension bus 86. At the same time, the multiplexer 154 couples the Ext_Bus_Out_En signal from the non-PCI interface 116 to the buffer 144, and the multiplexer 156 couples signals from the Ext_Bus_Out terminals of the non-PCI interface 114 to the IN terminal of the buffer 144. The non-PCI interfaces 114, 116 then have access to the PCI extension bus 86. In operation, either the PCI interface 100 or the non-PCI interfaces 114, 116 is enabled to allow signals to be coupled and from the PCI extension bus 86, as explained above with reference to FIGS. 3 and 4.

An alternative embodiment of the invention is illustrated in FIG. 6. In the embodiment of FIG. 5, the non-PCI interfaces 114, 116 do not share the same lines of the PCI extension bus 86. In contrast, in the embodiment of FIG. 6, the non-PCI interfaces 114, 116 do share the same lines of the PCI extension bus 86. Accordingly, only a single set of bidirectional buffers 142 is needed to couple signals between the non-PCI interfaces 114, 116 and the bus 86.

Multiplexers 160, 162 are used to couple EN and Ext_Bus_Out signals, respectively, from either the PCI interface 100, the non-PCI interface 114, or the non-PCI interface 116 depending upon the state of a pair of Ext_Bus_Sel bits from the PCI interface 100. Since the lines of the bus 86 designated by "A" are not used by the non-PCI interfaces 114, 116, these lines are routed directly to the PCI interface 100 without the need to multiplex them.

In operation, when the Ext_Bus_Sel bits have a first state, the signals from the PCI interface 100 labeled "B" are coupled through the multiplexer 162 and placed on the bus 86 when the EN signal from the PCI interface 100 is asserted, since the multiplexer 160 couples the EN signal from the PCI interface 100 to the EN input of the buffer 142. The signals labeled "B" coupled from the bus 86 are output from the buffer 142 directly to the PCI interface 100 as well as the non-PCI interfaces 114, 116, as explained above. Also, as mentioned above, the signals labeled "A" are coupled directly between the bus 86 and the PCI interface 100.

When the Ext_Bus_Sel bits have a second state, the signals from the non-PCI interface 114 labeled "B" are coupled through the multiplexer 162 and placed on the bus 86 when the EN signal from the non-PCI interface 114 is asserted, since the multiplexer 160 couples the EN signal from the non-PCI interface 114 to the EN input of the buffer 142. As mentioned above, the signals labeled "B" coupled from the bus 86 are output from the buffer 142 directly to the non-PCI interface 114. In the same manner, when the Ext_Bus_Sel bits have a third state, the signals from the non-PCI interface 116 labeled "B" are coupled through the multiplexer 162 and placed on the bus 86 when the EN signal from the non-PCI interface 116 is asserted, since the multiplexer 160 couples the EN signal from the non-PCI interface 116 to the EN input of the buffer 142.

Figure 7:
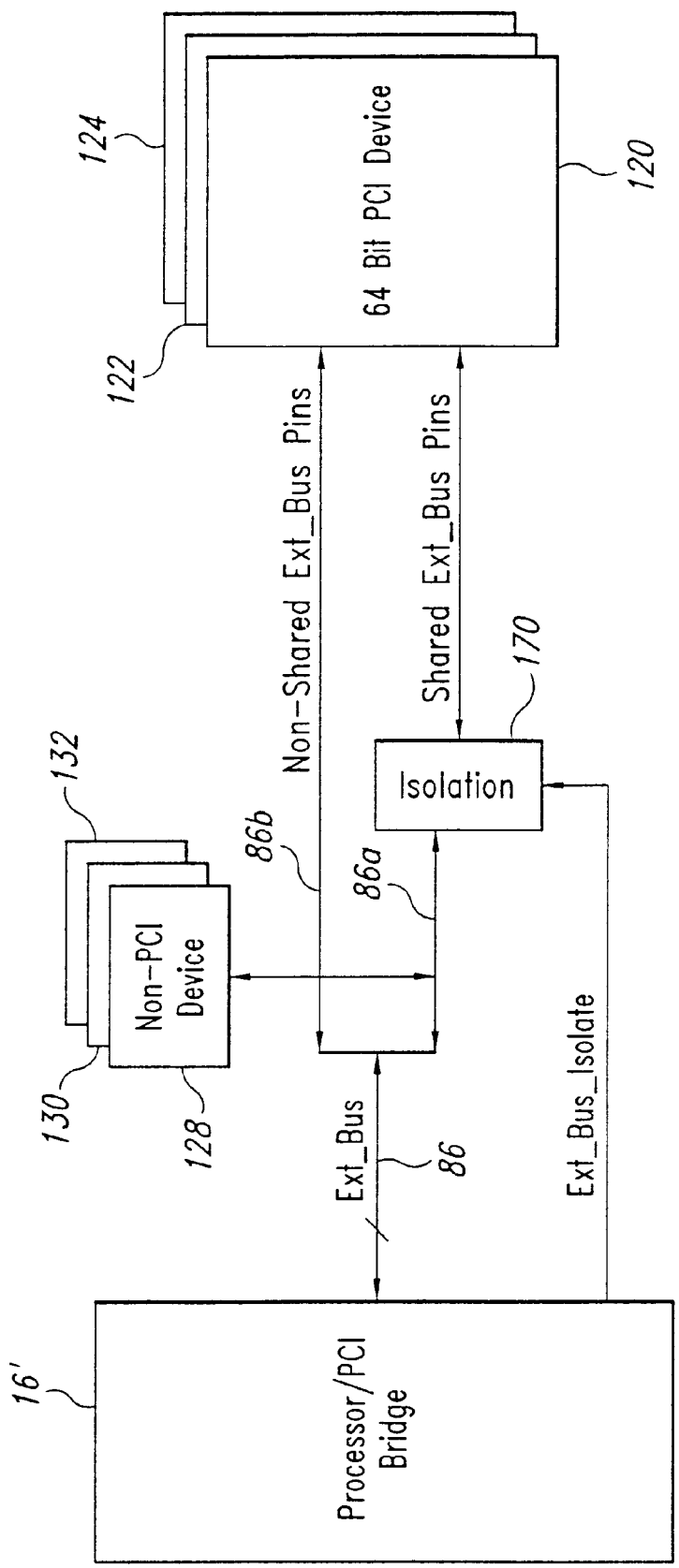
FIG. 7 is a block diagram of a portion of the computer system of FIG. 3 used to isolate 64-bit PCI devices from the PCI extension bus during data transfers with a non-PCI device.

As explained above with reference to FIG. 4, the current PCI protocol permits PCI master devices to output signals to the PCI extension bus 86 and even when they are restricted to a 32-bit data transfer by the absence of an ACK64# signal in response to a REQ64# signal. It is for this reason that PCI devices capable operating as a PCI master device should be isolated from the PCI extension bus 86 when a non-PCI interface 114, 116 is granted access to the bus 86. One embodiment of a circuit for performing this function is illustrated in FIG. 7. As explained above, a Processor/PCI bridge 16' is coupled to the PCI extension bus 86. Some of the signal lines 86a of the extension bus 86 are shared with several non-PCI devices 128, 130 (FIG. 4) and 132, while other signal lines 86b are used solely by the 64-bit PCI devices 120, 122 (FIG. 4) and 124. The shared lines 86a of the bus 86 are coupled to the 64-bit PCI devices 120–124 through it an isolation device 170 of conventional design. The conductive state of the isolation device 170 is controlled by the Ext_Bus_Isolate signal, which was explained above with reference to FIG. 4. When one of the non-PCI devices 128–130 is granted access to the PCI extension bus 86, the Ext_Bus_Isolate signal is asserted to cause the isolation device 170 to isolate the PCI devices 120–124 from the shared lines 86a of the PCI extension bus 86. Conversely, when one of the non-PCI devices 128–130 is not being granted access to the PCI extension bus 86, the Ext_Bus_Isolate signal is deasserted to cause the isolation device 170 to coupled the PCI devices 120–124 to the shared lines 86a of the PCI extension bus 86.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer system, comprising:
    a processor;
    a processor bus coupled to the processor;
    a relatively high speed peripheral device;
    a relatively low speed peripheral device;
    an expansion bus, the expansion bus having a first set of signal paths coupled to the relatively high speed peripheral device and a subset of the first set of signal paths coupled to the relatively low speed peripheral device; and
    a bus bridge coupled between the processor bus and the expansion bus, the bus bridge having a bus arbitration circuit comprising:
        a bus master coupled to the expansion bus, the bus master being constructed to apply to the relatively high speed peripheral device through the first set of signal paths of the expansion bus a signal requesting the relatively high speed peripheral device to perform a relatively wide bus data transfer and to receive from the relatively high speed peripheral device through the first set of signal paths of the expansion bus an acknowledgment signal indicating that the relatively high speed peripheral device can perform a relatively wide bus data transfer;
        a bus target coupled to the expansion bus, the bus target being constructed to receive from the relatively high speed peripheral device through the first set of signal paths of the expansion bus a signal indicating that the relatively high speed peripheral device is requesting to perform a relatively wide bus data transfer and to apply to the relatively high speed peripheral device through the first set of signal paths of the expansion bus an acknowledgment signal indicating that the bus bridge can perform a relatively wide bus data transfer;
        an interface circuit coupled to the subset of the first set of signal paths of the expansion bus; and
        a bus arbiter coupled to the relatively high speed peripheral device and the interface circuit, the bus arbiter constructed to receive a respective bus request signal from the relatively high speed peripheral device and the interface circuit, and to apply to the relatively high speed peripheral device in response to the respective bus request signal a first bus grant signal to allow the relatively high speed peripheral device to transfer data between the relatively high speed peripheral device and the first set of signal paths of the expansion bus, and to apply to the interface circuit in response to the respective bus request signal a second bus grant signal to allow the relatively low speed peripheral device to transfer data between the relatively low speed peripheral device and the first set of signal paths of the expansion bus.

2. The computer system of claim 1 wherein the first set of signal paths comprises at least some signal lines of a peripheral component interconnect bus and a peripheral component interconnect extension bus, and wherein the subset of the first set of signal paths comprises at least some signal lines of the peripheral component interconnect extension bus.

3. The computer system of claim 1 further comprising a plurality of signal lines not included in the expansion bus coupled between the bus bridge and the relatively low speed device.

4. The computer system of claim 1 wherein the subset of the first set of signal paths comprise less than all of the signal paths in the first set.

5. The computer system of claim 1 wherein a plurality of the relatively high speed peripheral devices coupled to the first set of signal paths of the expansion bus.

6. The computer system of claim 1 wherein a plurality of the relatively low speed peripheral devices coupled to the subset of the first set of signal paths of the expansion bus.

7. The computer system of claim 1 wherein the bus bridge comprises:
    a first bus interface having a data input terminal, a data output terminal, an enable output terminal, and a processor bus terminal coupled to the processor bus;
    a second bus interface having a data input terminal, a data output terminal, an enable output terminal, and a processor bus terminal coupled to the processor bus;

a bidirectional buffer having a data input terminal, a data output terminal, an enable input terminal, and a expansion bus terminal to be coupled to the subset of the first set of signal paths of the expansion bus, the data output terminal of the buffer being coupled to the data input terminal of the first bus interface and the data input terminal of the second bus interface;

a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

8. A computer system, comprising:

a processor;

a processor bus coupled to the processor;

a first peripheral device operating in accordance with a first protocol;

a second peripheral device operating in accordance with a second protocol;

an expansion bus, the expansion bus having a first set of signal paths coupled to the first peripheral device and a subset of the first set of signal paths coupled to the second peripheral device; and a bus bridge coupled between the processor bus and the expansion bus, the bus bridge having a bus arbitration circuit comprising:

a bus master coupled to the expansion bus, the bus master being constructed to apply to the relatively first peripheral device through the first set of signal paths of the expansion bus a signal requesting the relatively first peripheral device to perform a relatively wide bus data transfer and to receive from the first peripheral device through the first set of signal paths of the expansion bus an acknowledgment signal indicating that the first peripheral device can perform a relatively wide bus data transfer;

a bus target coupled to the expansion bus, the bus target being constructed to receive from the first peripheral device through the first set of signal paths of the expansion bus a signal indicating that the first peripheral device is requesting to perform a relatively wide bus data transfer and to apply to the first peripheral device through the first set of signal paths of the expansion bus an acknowledgement signal indicating that the bus bridge can perform a relatively wide bus data transfer;

an interface circuit coupled to the subset of the first set of signal paths of the expansion bus; and a bus arbiter coupled to the first peripheral device and the interface circuit, the bus arbiter constructed to receive a respective bus request signal from the first peripheral device and the interface circuit, and to apply to the first peripheral device in response to the respective bus request signal a first bus grant signal to allow the first peripheral device to transfer data between the first peripheral device and the first set of signal paths of the expansion bus, and to apply to the interface circuit in response to the respective bus request signal a second bus grant signal to allow the second peripheral device to transfer data between the second peripheral device and the first set of signal paths of the expansion bus.

9. The computer system of claim 8 wherein the first set of signal paths comprises at least some signal lines of a peripheral component interconnect bus and a peripheral component interconnect extension bus, and wherein the subset of the first set of signal paths comprises at least some signal lines of the peripheral component interconnect extension bus.

10. The computer system of claim 8 further comprising a plurality of signal lines not included in the expansion bus coupled between the bus bridge and the relatively low speed device.

11. The computer system of claim 8 wherein the subset of the first set of signal paths comprise less than all of the signal paths in the first set.

12. The computer system of claim 8 wherein a plurality of peripheral devices are coupled to the first set of signal paths of the expansion bus in addition to the first peripheral device.

13. The computer system of claim 8 wherein a plurality of peripheral devices are coupled to the subset of the first set of signal paths of the expansion bus in addition to the second peripheral device.

14. The computer system of claim 8 wherein the bus bridge comprises:

a first bus interface having a data input terminal, a data output terminal, an enable output terminal, and a processor bus terminal coupled to the processor bus;

a second bus interface having a data input terminal, a data output terminal, an enable output terminal, and a processor bus terminal coupled to the processor bus;

a bidirectional buffer having a data input terminal, a data output terminal, an enable input terminal, and a expansion bus terminal to be coupled to the subset of the first set of signal paths of the expansion bus, the data output terminal of the buffer being coupled to the data input terminal of the first bus interface and the data input terminal of the second bus interface;

a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

15. A computer system, comprising:

a processor;

a processor bus coupled to the processor;

a peripheral component interconnect ("PCI") peripheral device;

a non-PCI peripheral device;

a PCI bus, the PCI bus having a first set of signal paths coupled to the PCI device and a second set of signal paths coupled to the non-PCI device; and a Processor/PCI bus bridge coupled between the processor bus and the PCI bus, the bus bridge having a bus arbitration circuit comprising:

a bus master coupled to the PCI bus, the bus master being constructed to apply to the PCI peripheral device through the first set of signal paths a signal requesting the PCI peripheral device to perform a relatively wide bus data transfer and to receive from the PCI peripheral device through the first set of signal paths an acknowledgement signal indicating that the PCI peripheral device can perform a relatively wide bus data transfer;

a bus target coupled to the PCI bus, the bus target being constructed to receive from the PCI peripheral device through the first set of signal paths a signal indicating that the PCI peripheral device is requesting to perform a relatively wide bus data transfer and to apply to the PCI peripheral device through the first set of signal paths an acknowledgement signal indicating that the bus bridge can perform a relatively wide bus data transfer;

an interface circuit coupled to the second set of signal paths of the PCI bus; and a bus arbiter coupled to the PCI peripheral device and the interface circuit, the bus arbiter constructed to receive a respective bus request signal from the PCI peripheral device and the interface circuit, and to apply to the PCI peripheral device in response to the respective bus request signal a first bus grant signal to allow the PCI peripheral device to transfer data between the PCI peripheral device and the first set of signal paths, and to apply to the interface circuit in response to the respective bus request signal a second bus grant signal to allow the non-PCI peripheral device to transfer data between the non-PCI peripheral device and the second set of signal paths.

16. The computer system of claim 15 wherein the PCI bus comprises a normal PCI bus and a PCI extension bus, wherein the first set of signal paths comprises at least some signal lines of the normal PCI bus, and wherein the second set of signal paths comprises at least some signal lines of the PCI extension bus.

17. The computer system of claim 15 wherein the first set of signal paths further comprises at least some signal lines of the PCI extension bus.

18. The computer system of claim 16 further comprising a plurality of signal lines not included in either the normal PCI bus or the PCI extension bus coupled between the bus bridge and the non-PCI peripheral device.

19. The computer system of claim 16 wherein the second set of signal paths comprise less than all of the signal paths in the PCI extension bus.

20. The computer system of claim 15 wherein the first set of signal paths of the PCI bus encompasses the second set of signal paths of the PCI bus.

21. The computer system of claim 15 wherein a plurality of PCI peripheral devices are coupled to the first set of signal paths of the PCI bus.

22. The computer system of claim 15 wherein a plurality of non-PCI peripheral device are coupled to the second set of signal paths of the PCI bus.

23. The computer system of claim 15 herein the bus bridge comprises:

a first bus interface having a data input terminal, a data output terminal, an enable output terminal, and a processor bus terminal coupled to the processor bus;

a second bus interface having a data input terminal, a data output terminal, an enable output terminal, and a processor bus terminal coupled to the processor bus;

a bidirectional buffer having a data input terminal, a data output terminal, an enable input terminal, and a bus terminal to be coupled to the second set of signal paths of the PCI bus, the data output terminal of the buffer being coupled to the data input terminal of the first bus interface and the data input terminal of the second bus interface;

a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

24. The computer system of claim 15 further comprising a second bidirectional buffer having a data input terminal, a data output terminal, an enable input terminal, and a bus terminal to be coupled to the first set of signal paths of the PCI bus, the data output terminal of the buffer being coupled to the data input terminal of the first bus interface, and data input terminal of the buffer being coupled to the data output terminal of the first bus interface.

25. A bus bridge adapted to be coupled between a set of processor bus terminals and a set of expansion bus terminals, comprising:

a first interface constructed to transfer a first set of digital signals between the processor bus terminals and a first set of expansion bus terminals;

a second interface constructed to transfer a second set of digital signals between the processor bus terminals and a subset of the first set of expansion bus terminals;

a coupling circuit coupled to the expansion bus terminals and the first and second interfaces, the coupling circuit comprising:

a bidirectional buffer having data input terminals, data output terminals, an enable input terminal, and expansion bus output terminals coupled to the expansion bus terminals, the data output terminals of the buffer being coupled to data input terminals of the first and second interfaces;

a first multiplexer having a control terminal coupled to receive a bus select signal, the first multiplexer having a first set of input terminals coupled to respective data output terminals of the first interface, a second set of input terminals coupled to respective data output terminals of the second interface, and output terminals coupled to the data input terminals of the bidirectional buffer; and a second multiplexer having a control terminal coupled to receive the bus select signal, the second multiplexer having a first input terminal coupled to an enable output terminal of the first interface, a second input terminal coupled to an enable output terminal of the second bus interface, and an output terminal coupled to the enable input terminal of the bidirectional buffer; and a bus arbitration circuit comprising:

a bus master coupled to the first expansion bus terminals, the bus master being constructed to apply to the first set of expansion bus terminals a signal requesting a relatively wide data transfer and to receive from the first set of expansion bus terminals an acknowledgement signal indicating that the relatively wide bus data transfer can occur;

a bus target coupled to the first expansion bus terminals, the bus target being constructed to receive from the first set of expansion bus terminals a signal indicating that a request is being made to perform a relatively wide bus data transfer and to apply to the first set of expansion bus terminals an acknowledgement signal indicating that the bus bridge can perform a relatively wide data transfer; and a bus arbiter coupled to the first set of expansion bus terminals and the second interface circuit, the bus arbiter constructed to receive a respective bus request signal from the first set of expansion bus terminals and the second interface circuit, and to apply to the first set of expansion bus terminals in response to the respective bus request signal a first bus grant signal to allow data transfer through the first interface circuit and to apply to the second interface circuit in response to the respective bus request signal a second bus grant signal to allow data transfer thorough the second interface circuit.

26. The bus bridge of claim 25 wherein the first interface comprises a peripheral component interconnect ("PCI") interface, and wherein the second interface comprises a non-PCI interface.

27. The bus bridge of claim 25 wherein the first and second sets of expansion bus terminals comprise peripheral component interconnect ("PCI") extension bus terminals.

28. The bus bridge of claim 27 wherein the first set of expansion bus terminals further comprise normal PCI bus terminals.

29. The bus bridge of claim 25 further comprising a second bidirictional buffer having data input terminals, data input terminals, an enable input terminal, and expansion bus output terminals coupled to the expansion bus terminals, the data output terminal of the second bidirectional buffer being coupled to the data input terminals of the first interface, and the data input terminals of the second bidirectional buffer being coupled to the data output terminals of the first interface.

30. A bus bridge comprising:
a first interface constructed to transfer a first set of digital signals between a set of processor bus terminals and a first set of peripheral component interconnect ("PCI") bus terminals;
a second interface constructed to transfer a second set of digital signals between the set of processor bus terminals and a second set of PCI bus terminals;
a coupling circuit coupled to the expansion bus terminals and the first and second interfaces, the coupling circuit comprising:
a bidirectional buffer having data input terminals, data output terminals, an enable input terminal, and expansion bus output terminals coupled to the second set of PCI bus terminals, the data output terminals of the buffer being coupled to data input terminals of the first and second interfaces;
a first multiplexer having a control terminal coupled to receive a bus select signal, the first multiplexer having a first set of input terminals coupled to respective data output terminals of the first interface, a second set of input terminals coupled to respective data output terminals of the second interface, and output terminals coupled to the data input terminals of the bidirectional buffer; and
a second multiplexer having a control terminal coupled to receive the bus select signal, the second multiplexer having a first input terminal coupled to an enable output terminal of the first interface, a second input terminal coupled to an enable output terminal of the second bus interface, and an output terminal coupled to the enable input terminal of the bidirectional buffer; and
a PCI bus arbitration circuit comprising:
a PCI master coupled to the second set of PCI bus terminals, the PCI master being constructed to apply to at least one of terminals in the second set a signal requesting a relatively wide data transfer and to receive from at least one of the terminals in the second set an acknowledgement signal indicating that the relatively wide bus data transfer can occur;
a bus target coupled to at least one of the terminals in the second set, the bus target being constructed to receive from at least one of the terminals in the second set a signal indicating that a request is being made to perform a relatively wide bus data transfer and to apply to at least one of the terminals in the second set an acknowledgement signal indicating that the bus bridge can perform a relatively wide data transfer; and
a bus arbiter coupled to the first set of PCI bus terminals and the second interface circuit, the bus arbiter constructed to receive a respective bus request signal from the first set of PCI bus terminals and the second interface circuit, and to apply to at least one of the first set of PCI bus terminals in response to the respective bus request signal a first bus grant signal to allow data transfer through the first interface circuit, and to apply to the second interface circuit in response to the respective bus request signal a second bus grant signal to allow data transfer thorough the second interface circuit.

31. The computer system of claim 30 wherein the first set of PCI bus terminals comprises a set of normal PCI bus terminals and the second set of PCI bus terminals comprises a set of PCI extension bus terminals.

32. The computer system of claim 31 wherein the first set of PCI bus terminals further comprises a set of PCI extension bus terminals.

33. The bus bridge of claim 30 further comprising a second bidirectional buffer having data input terminals, data output terminals, an enable input terminal, and set of bus terminal coupled to the first set of PCI bus terminals, the data output terminals of the buffer being coupled to the data input terminals of the first interface, and data input terminals of the buffer being coupled to the data output terminals of the first interface.

34. A computer system, comprising:
a processor;
a processor bus coupled to the processor;
a relatively high speed peripheral device;
a relatively low speed peripheral device;
an expansion bus, the expansion bus having a first set of signal paths coupled to the relatively high speed peripheral device and a subset of the first set of signal paths coupled to the relatively low speed peripheral device; and
a bus bridge coupled between the processor bus and the expansion bus, comprising:
a first bus interface having a data input terminal, a data output terminal, an enable output terminal, and a processor bus terminal coupled to the processor bus;
a second bus interface having a data input terminal, a data output terminal, an enable output terminal, and a processor bus terminal coupled to the processor bus;
a bidirectional buffer having a data input terminal, a data output terminal, an enable input terminal, and a expansion bus terminal to be coupled to the subset of the first set of signal paths of the expansion bus, the data output terminal of the buffer being coupled to the data input terminal of the first bus interface and the data input terminal of the second bus interface;
a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

35. The computer system of claim 34 wherein the first set of signal paths comprises at least some signal lines of a peripheral component interconnect bus and a peripheral component interconnect extension bus, and wherein the subset of the first set of signal paths comprises at least some signal lines of the peripheral component interconnect extension bus.

36. The computer system of claim 34 further comprising a plurality of signal lines not included in the expansion bus coupled between the bus bridge and the relatively low speed device.

37. The computer system of claim 34 wherein the subset of the first set of signal paths comprise less than all of the signal paths in the first set.

38. The computer system of claim 34 wherein the bus bridge includes a bus arbitration circuit comprising:

a bus master coupled to the expansion bus, the bus master being constructed to apply to the relatively high speed peripheral device through the first set of signal paths of the expansion bus a signal requesting the relatively high speed peripheral device to perform a relatively wide bus data transfer and to receive from the relatively high speed peripheral device through the first set of signal paths of the expansion bus an acknowledgment signal indicating that the relatively high speed peripheral device can perform a relatively wide bus data transfer;

a bus target coupled to the expansion bus, the bus target being constructed to receive from the relatively high speed peripheral device through the first set of signal paths of the expansion bus a signal indicating that the relatively high speed peripheral device is requesting to perform a relatively wide bus data transfer and to apply to the relatively high speed peripheral device through the first set of signal paths of the expansion bus an acknowledgment signal indicating that the bus bridge can perform a relatively wide bus data transfer;

an interface circuit coupled to the subset of the first set of signal paths of the expansion bus; and a bus arbiter coupled to the relatively high speed peripheral device and the interface circuit, the bus arbiter constructed to receive a respective bus request signal from the relatively high speed peripheral device and the interface circuit, and to apply to the relatively high speed peripheral device in response to the respective bus request signal a first bus grant signal to allow the relatively high speed peripheral device to transfer data between the relatively high speed peripheral device and the first set of signal paths of the expansion bus, and to apply to the interface circuit in response to the respective bus request signal a second bus grant signal to allow the relatively low speed peripheral device to transfer data between the relatively low speed peripheral device and the first set of signal paths of the expansion bus.

39. The computer system of claim 34 wherein a plurality of the relatively high speed peripheral devices coupled to the first set of signal paths of the expansion bus.

40. The computer system of claim 34 wherein a plurality of the relatively low speed peripheral devices coupled to the subset of the first set of signal paths of the expansion bus.

41. A computer system, comprising:

a processor;

a processor bus coupled to the processor;

a first peripheral device operating in accordance with a first protocol;

a second peripheral device operating in accordance with a second protocol;

an expansion bus, the expansion bus having a first set of signal paths coupled to the first peripheral device and a subset of the first set of signal paths coupled to the second peripheral device; and a bus bridge coupled between the processor bus and the expansion bus, comprising:

a first bus interface having a data input terminal, a data output terminal, an enable output terminal, and a processor bus terminal coupled to the processor bus;

a second bus interface having a data input terminal, a data output terminal, an enable output terminal, and a processor bus terminal coupled to the processor bus;

a bidirectional buffer having a data input terminal, a data output terminal, an enable input terminal, and a expansion bus terminal to be coupled to the subset of the first set of signal paths of the expansion bus, the data output terminal of the buffer being coupled to the data input terminal of the first bus interface and the data input terminal of the second bus interface;

a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

42. The computer system of claim 41 wherein the first set of signal paths comprises at least some signal lines of a peripheral component interconnect bus and a peripheral component interconnect extension bus, and wherein the subset of the first set of signal paths comprises at least some signal lines of the peripheral component interconnect extension bus.

43. The computer system of claim 41 further comprising a plurality of signal lines not included in the expansion bus coupled between the bus bridge and the relatively low speed device.

44. The computer system of claim 41 wherein the subset of the first set of signal paths comprise less than all of the signal paths in the first set.

45. The computer system of claim 41 wherein the bus bridge includes a bus arbitration circuit comprising:

a bus master coupled to the expansion bus, the bus master being constructed to apply to the relatively first peripheral device through the first set of signal paths of the expansion bus a signal requesting the relatively first peripheral device to perform a relatively wide bus data transfer and to receive from the first peripheral device through the first set of signal paths of the expansion bus an acknowledgment signal indicating that the first peripheral device can perform a relatively wide bus data transfer;

a bus target coupled to the expansion bus, the bus target being constructed to receive from the first peripheral device through the first set of signal paths of the expansion bus a signal indicating that the first peripheral device is requesting to perform a relatively wide bus data transfer and to apply to the first peripheral device through the first set of signal paths of the expansion bus an acknowledgement signal indicating that the bus bridge can perform a relatively wide bus data transfer;

an interface circuit coupled to the subset of the first set of signal paths of the expansion bus; and a bus arbiter coupled to the first peripheral device and the interface circuit, the bus arbiter constructed to receive a respective bus request signal from the first peripheral device and the interface circuit, and to apply to the first peripheral device in response to the respective bus request signal a first bus grant signal to allow the first peripheral device to transfer data between the first peripheral device and the first set of signal paths of the expansion bus, and to apply to the interface circuit in response to the respective bus request signal a second bus grant signal to allow the second peripheral device to transfer data between the second peripheral device and the first set of signal paths of the expansion bus.

46. The computer system of claim 41 wherein a plurality of peripheral devices are coupled to the first set of signal paths of the expansion bus in addition to the first peripheral device.

47. The computer system of claim 41 wherein a plurality of peripheral devices are coupled to the subset of the first set of signal paths of the expansion bus in addition to the second peripheral device.

48. A computer system, comprising:
a processor;
a processor bus coupled to the processor;
a peripheral component interconnect ("PCI") peripheral device;
a non-PCI peripheral device;
a PCI bus, the PCI bus having a first set of signal paths coupled to the PCI device and a second set of signal paths coupled to the non-PCI device; and
a Processor/PCI bus bridge coupled between the processor bus and the PCI bus, the bus bridge comprising:
 a first bus interface having a data input terminal, a data output terminal, an enable output terminal, and a processor bus terminal coupled to the processor bus;
 a second bus interface having a data input terminal, a data output terminal, an enable output terminal, and a processor bus terminal coupled to the processor bus;
 a bidirectional buffer having a data input terminal, a data output terminal, an enable input terminal, and a bus terminal to be coupled to the second set of signal paths of the PCI bus, the data output terminal of the buffer being coupled to the data input terminal of the first bus interface and the data input terminal of the second bus interface;
 a first multiplexer having a control terminal coupled to receive a bus select signal, the first multiplexer having a first input terminal coupled to the data output terminal of the first bus interface, a second input terminal coupled to the data output terminal of the second bus interface, and an output terminal coupled to the data input terminal of the bidirectional buffer; and
 a second multiplexer having a control terminal coupled to receive the bus select signal, the second multiplexer having a first input terminal coupled to the enable output terminal of the first bus interface, a second input terminal coupled to the enable output terminal of the second bus interface, and an output terminal coupled to the enable input terminal of the bidirectional buffer.

49. The computer system of claim 48 wherein the PCI bus comprises a normal PCI bus and a PCI extension bus, wherein the first set of signal paths comprises at least some signal lines of the normal PCI bus, and wherein the second set of signal paths comprises at least some signal lines of the PCI extension bus.

50. The computer system of claim 49 wherein the first set of signal paths further comprises at least some signal lines of the PCI extension bus.

51. The computer system of claim 49 further comprising a plurality of signal lines not included in either the normal PCI bus or the PCI extension bus coupled between the bus bridge and the non-PCI peripheral device.

52. The computer system of claim 49 wherein the second set of signal paths comprise less than all of the signal paths in the PCI extension bus.

53. The computer system of claim 48 wherein the bus bridge includes a bus arbitration circuit comprising:
a bus master coupled to the PCI bus, the bus master being constructed to apply to the PCI peripheral device through the first set of signal paths a signal requesting the PCI peripheral device to perform a relatively wide bus data transfer and to receive from the PCI peripheral device through the first set of signal paths an acknowledgement signal indicating that the PCI peripheral device can perform a relatively wide bus data transfer;
a bus target coupled to the PCI bus, the bus target being constructed to receive from the PCI peripheral device through the first set of signal paths a signal indicating that the PCI peripheral device is requesting to perform a relatively wide bus data transfer and to apply to the PCI peripheral device through the first set of signal paths an acknowledgement signal indicating that the bus bridge can perform a relatively wide bus data transfer;
an interface circuit coupled to the second set of signal paths of the PCI bus; and
a bus arbiter coupled to the PCI peripheral device and the interface circuit, the bus arbiter constructed to receive a respective bus request signal from the PCI peripheral device and the interface circuit, and to apply to the PCI peripheral device in response to the respective bus request signal a first bus grant signal to allow the PCI peripheral device to transfer data between the PCI peripheral device and the first set of signal paths, and to apply to the interface circuit in response to the respective bus request signal a second bus grant signal to allow the non-PCI peripheral device to transfer data between the non-PCI peripheral device and the second set of signal paths.

54. The computer system of claim 53 wherein the first set of signal paths of the PCI bus encompasses the second set of signal paths of the PCI bus.

55. The computer system of claim 48 wherein a plurality of PCI peripheral devices are coupled to the first set of signal paths of the PCI bus.

56. The computer system of claim 48 wherein a plurality of non-PCI peripheral device are coupled to the second set of signal paths of the PCI bus.

57. The computer system of claim 48 further comprising a second bidirectional buffer having a data input terminal, a data output terminal, an enable input terminal, and a bus terminal to be coupled to the first set of signal paths of the PCI bus, the data output terminal of the buffer being coupled to the data input terminal of the first bus interface, and data input terminal of the buffer being coupled to the data output terminal of the first bus interface.

* * * * *

UNITED STATES PATENT AND TRADEMARK OFFICE
CERTIFICATE OF CORRECTION

PATENT NO.    : 6,370,593 B1
DATED         : April 9, 2002
INVENTOR(S)   : Douglas A. Larson It is certified that error appears in the above-identified patent and that said Letters Patent is hereby corrected as shown below:

Title page,
Item [54], reads "EXPANSION" should read -- EXPANSION BUS --
Item [57], ABSTRACT,
Line 1, reads "includes" should read -- including --

Column 13,
Line 2, reads "and a" should read -- and an --

Column 14,
Line 34, reads "and a" should read -- and an --

Column 15,
Line 38, reads "claim 15" should read -- claim 16 --
Line 57, reads "herein" should read -- wherein --

Column 17,
Line 15, reads "thorough" should read -- through --

Column 18,
Line 25, reads "thorough" should read -- through --
Line 37, reads "terminal" should read -- terminals --
Line 62, reads "and a" should read -- and an --

Column 20,
Line 28, reads "and a" -- and an --

UNITED STATES PATENT AND TRADEMARK OFFICE
CERTIFICATE OF CORRECTION

PATENT NO. : 6,370,593 B1
DATED : April 9, 2002
INVENTOR(S) : Douglas A. Larson

It is certified that error appears in the above-identified patent and that said Letters Patent is hereby corrected as shown below:

<u>Column 22,</u>
Line 70, reads "device" should read -- devices --

Signed and Sealed this

Twelfth Day of November, 2002

Attest:

Attesting Officer

JAMES E. ROGAN
*Director of the United States Patent and Trademark Office*